INVENTORS
JAMES R. EVANS
ROBERT A. JONES
BY Ronald J. Clark
ATTORNEY

Oct. 29, 1968  J. R. EVANS ET AL  3,408,631
RECORD SEARCH SYSTEM

Filed March 28, 1966  12 Sheets-Sheet 2

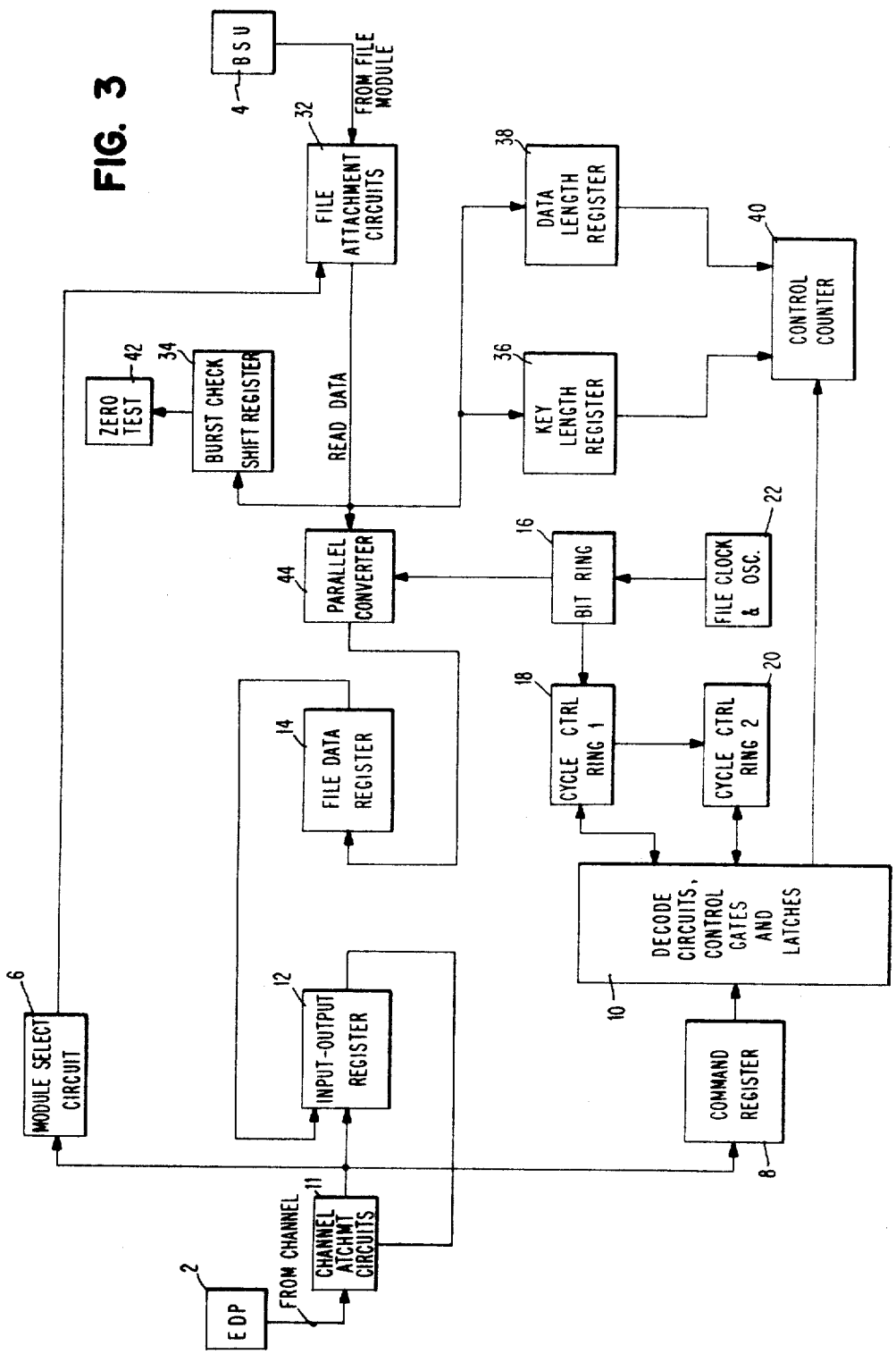

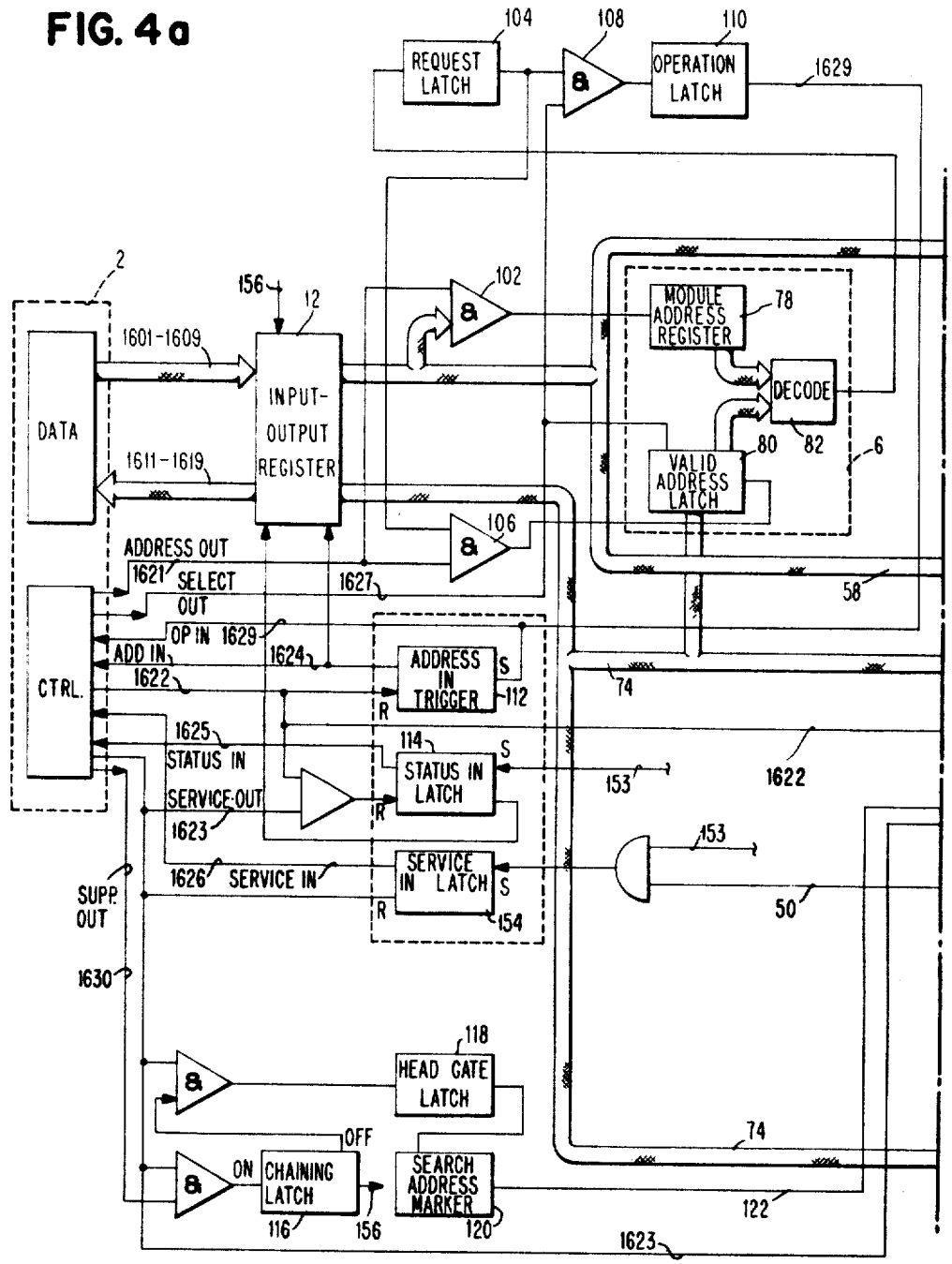

Oct. 29, 1968   J. R. EVANS ET AL   3,408,631
RECORD SEARCH SYSTEM

Filed March 28, 1966   12 Sheets-Sheet 6

Oct. 29, 1968  J. R. EVANS ET AL  3,408,631
RECORD SEARCH SYSTEM
Filed March 28, 1966  12 Sheets-Sheet 7

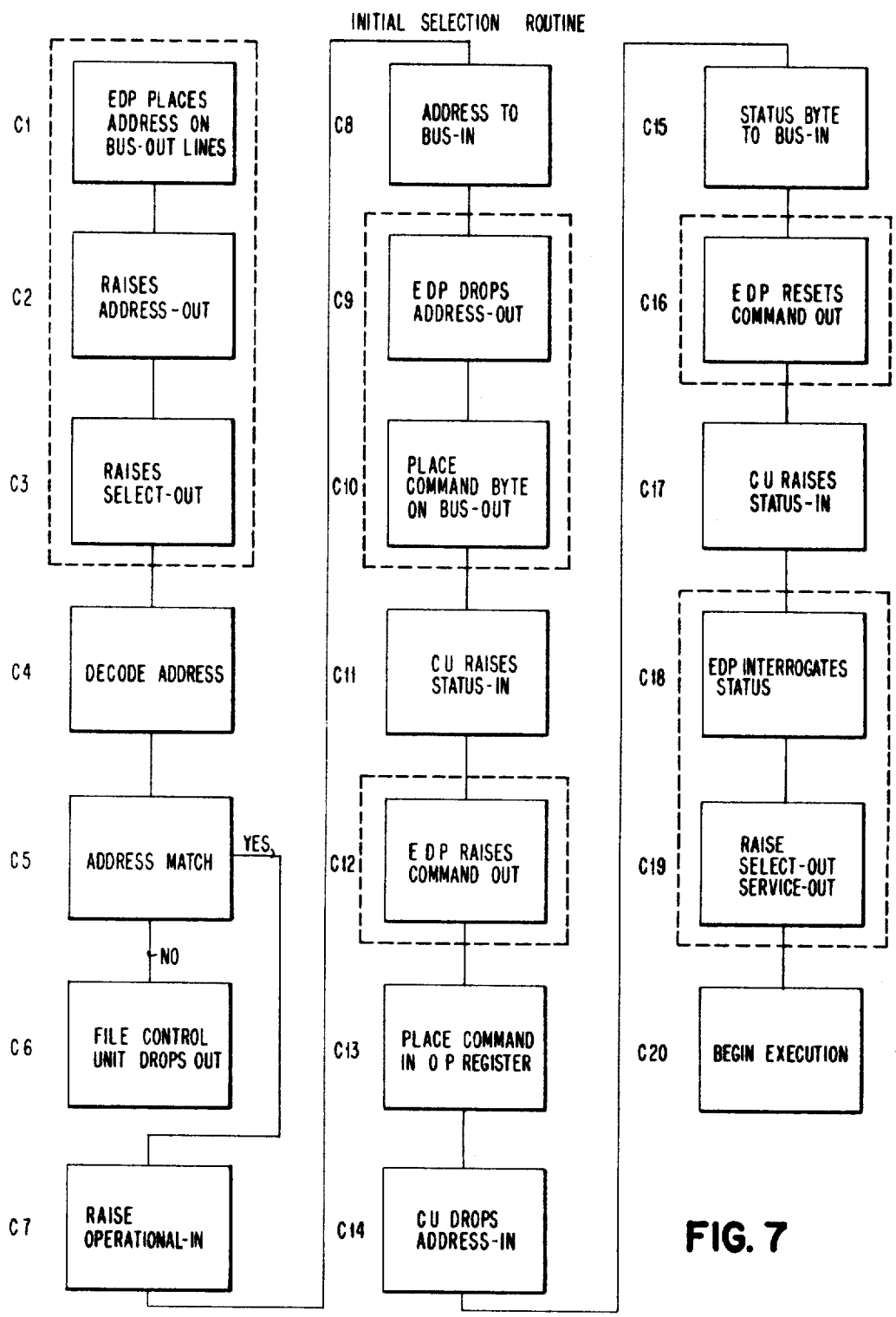

United States Patent Office

3,408,631
Patented Oct. 29, 1968

3,408,631
RECORD SEARCH SYSTEM
James R. Evans, Endicott, and Robert A. Jones, Endwell, N.Y., assignors to International Business Machines Corporation, Armonk, N.Y., a corporation of New York
Filed Mar. 28, 1966, Ser. No. 537,998
7 Claims. (Cl. 340—172.5)

ABSTRACT OF THE DISCLOSURE

A record search system characterized by a data processor storing a search mask, a bulk storage unit storing a plurality of records on tracks, first means for reading each of said records, second means for comparing a key field with said search mask and for generating a signal indicating the location of the desired key field during a corresponding portion of one revolution, and a third means responsive to said signal for reading said data field during a corresponding portion of the same revolution.

---

The present invention is directed to an improved record search system and, more particularly, to a record search system wherein the contents of each record are scanned in a series of distinct steps and wherein the result of each step determines the advance to the next successive step or the repetition of the last previous step.

Record retrieval systems, employing a key search operation to retrieve a desired record from a bulk storage unit for application to an associated data processing unit, are well known in the prior art. Special purpose record retrieval systems constructed solely to operate in a load by address mode and unload in a key search mode do not possess the flexibility to be used as a general purpose record retrieval system which loads by address and unloads by address mode or key search mode. A general purpose system as hereinafter described performs a key search operation for a key located anywhere in the record. Additionally, the record may be of variable length, and the length of the variable length record need not be known. Finally, the complexity of the hardware and the amount of hardware required are kept to a minimum in the instant invention by subdividing a key search operation into a plurality of sub-operations and by chaining distinct sub-operations together to perform the key search operation.

The invention is described in an embodiment comprising a bulk storage control unit. For example, the records are stored in a bulk storage unit comprising a plurality of magnetic disks and an access mechanism therefor. Drums, strip files, and tapes comprise other suitable bulk storage units which are suitable for use in the instant invention. The control signals are furnished by an electronic data processor (EDP). Each of the magnetic disks comprises a plurality of concentric tracks upon which sequential records are arranged.

The present invention is directed to a record search system wherein the versatility of the system causes the transfer of the desired record to its associated EDP during a single traverse of the record. After the access mechanism has been positioned in the BSU disk file unit, a record start signal begins the comparison process between the subsequent data signals and the search mask held in the associated EDP. The actual comparison is performed in the file control unit. The disk file control unit signals the EDP when the mask and the data signals are equal. Additionally, the file control unit can be instructed to signal the EDP when the comparison between the search mask and the data signals is either high or low. The EDP then initiates the subsequent transfer of the desired record from the bulk storage unit (BSU). No rotational delay exists in the present invention when the key signals precede the data signals in the record. Therefore, the EDP unit is only involved with the record retrieval operation for a minimum time duration.

Accordingly, it is an object of the instant invention to provide an improved record search system wherein there is no delay between the location of a particular key signal and the retrieval of its associated and subsequently positioned data signals.

It is another object of the instant invention to provide an improved record search system which immediately transfers a desired record to a requesting EDP upon the recognition of a key signal without the need for a temporary buffer storage unit.

In those instances when the key signal is either a distinct and separate portion of the data signal area or when the key signal is mixed with the data signals, a rotational delay of one revolution is necessary since temporary storage for each record is not provided while the key search operation is being performed. Therefore, it is another object of the instant invention to provide an improved record search system operative to retrieve a record when the key signal is located collectively at any portion of the record or is located distributively throughout the record.

The search systems taught by the prior art operate with records having a fixed maximum length. It is a further object of the present invention to provide an improved record search system to operate with records of variable length. Additionally, the value of the present invention is enhanced because of its capability of operating without the requirement of a temporary buffer storage circuit. More specifically, the capability of the present invention to locate a desired record in a BSU and transfer it to a requesting EDP during a single traverse of the record and the additional capability of operating upon records having variable length provides a truly general purpose record search system.

According to these objects, the instant invention comprises a file control unit having a plurality of functional units responsive to a pair of data channels, command lines and control signals. The data channels provide a data link between the requesting EDP and the BSU. The command lines carry enabling signals between the EDP and the file control unit, while the control signals originate from a decode circuit located in the file control unit.

The flexibility of the system is increased by the use of the decode circuit in the file control unit itself. An operation code (op. code) signal is applied to the decode circuit from the EDP over the data channel. The op. code signal is decoded, generating in a predetermined sequence a plurality of control signals for controlling a particular operation. A plurality of op. codes are required to perform each search operation.

The foregoing and other objects, features and advantages of the invention will be apparent from the following more particular description of a preferred embodiment of the invention, as illustrated in the accompanying drawings; wherein FIG. 1 is a block diagram showing the data flow in the instant invention between an associated data processor and a bulk storage unit;

FIG. 2b is a more detailed schematic diagram of the count field data portion of the record shown in FIG. 2a;

FIG. 3 is a block diagram showing the data flow in the instant invention between an associated bulk storage unit and data processor;

Figure 6A:
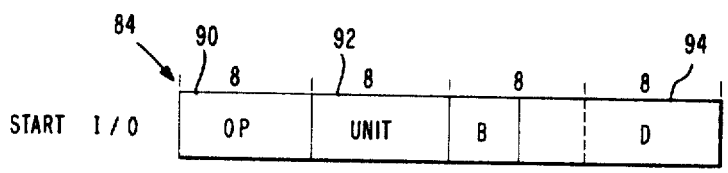
Figure 6B:
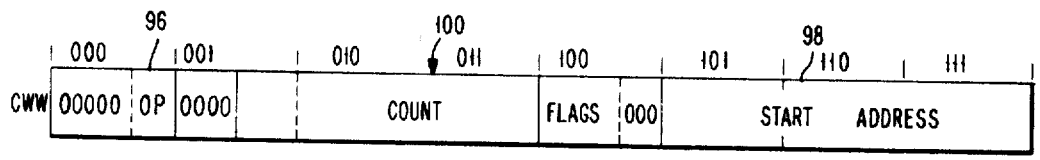
Figure 4B:
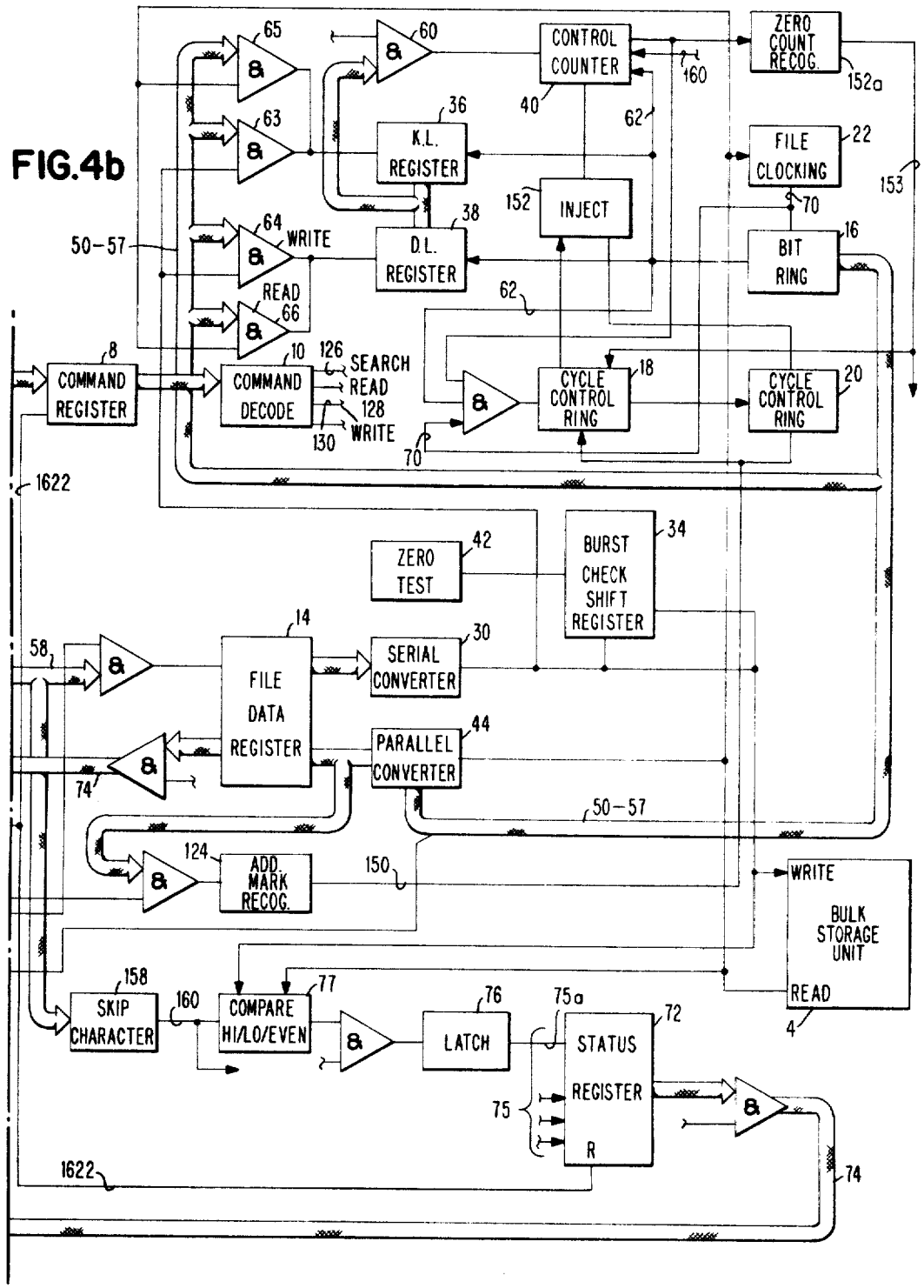
Figure 5:
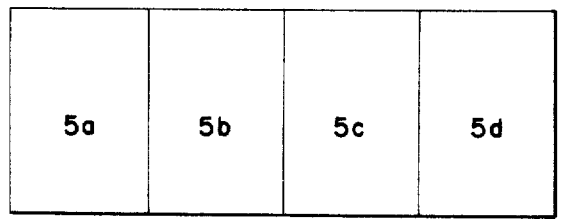
Figure 5A:
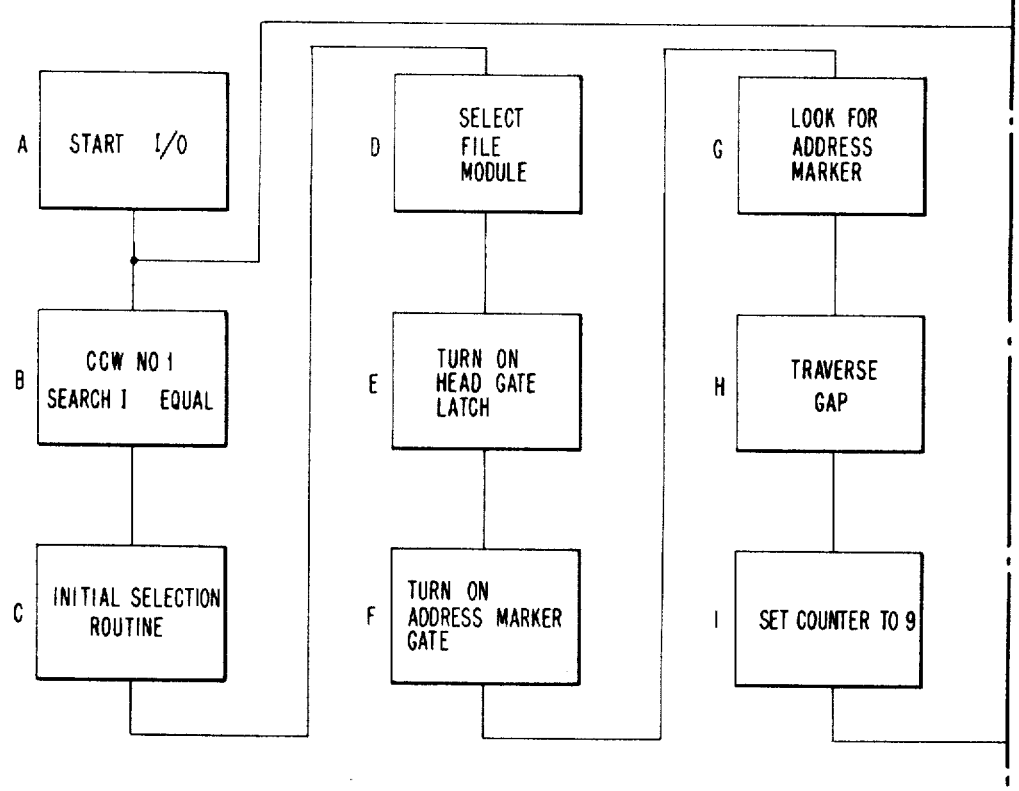
Figure 5B:
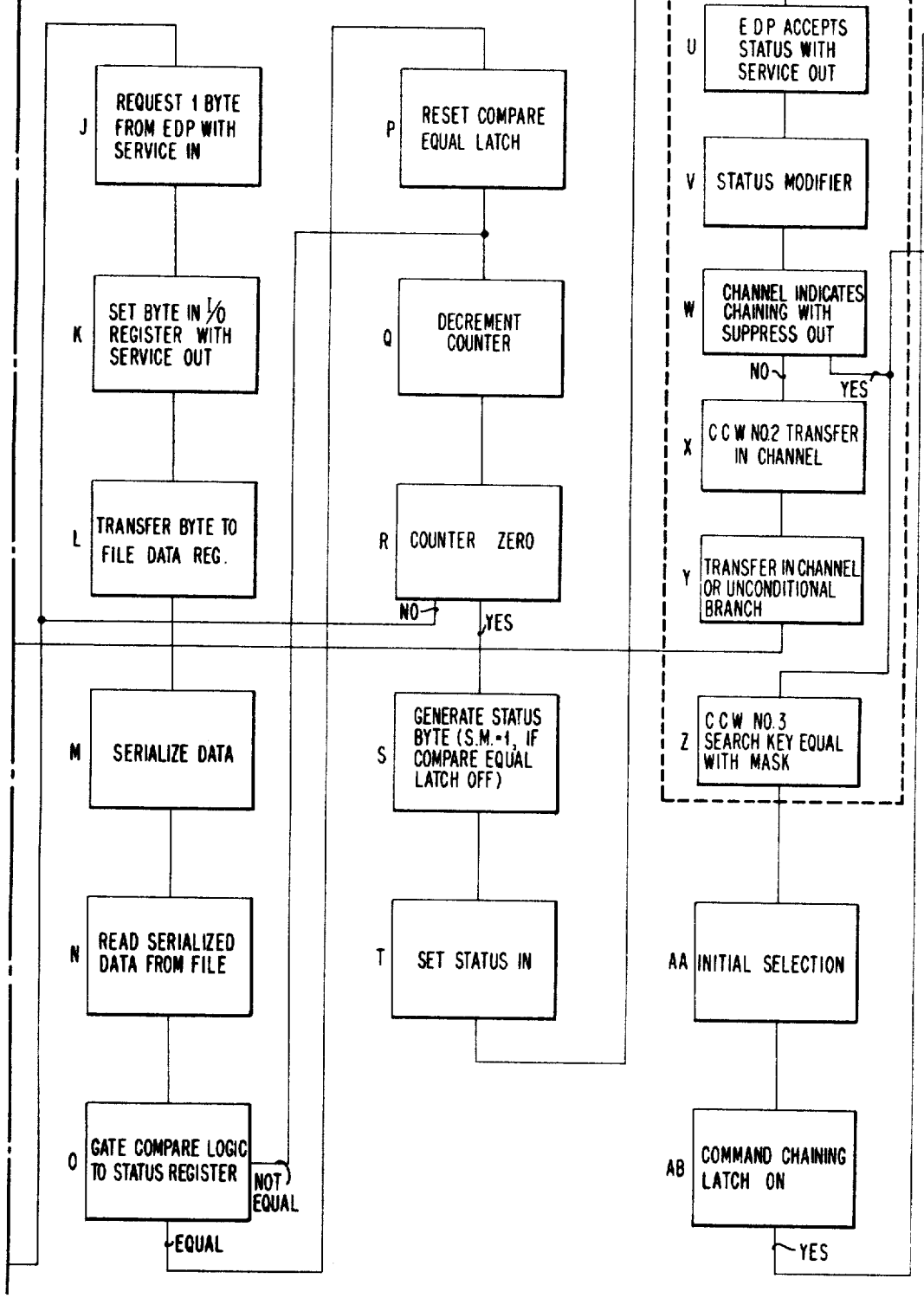
Figure 5C:
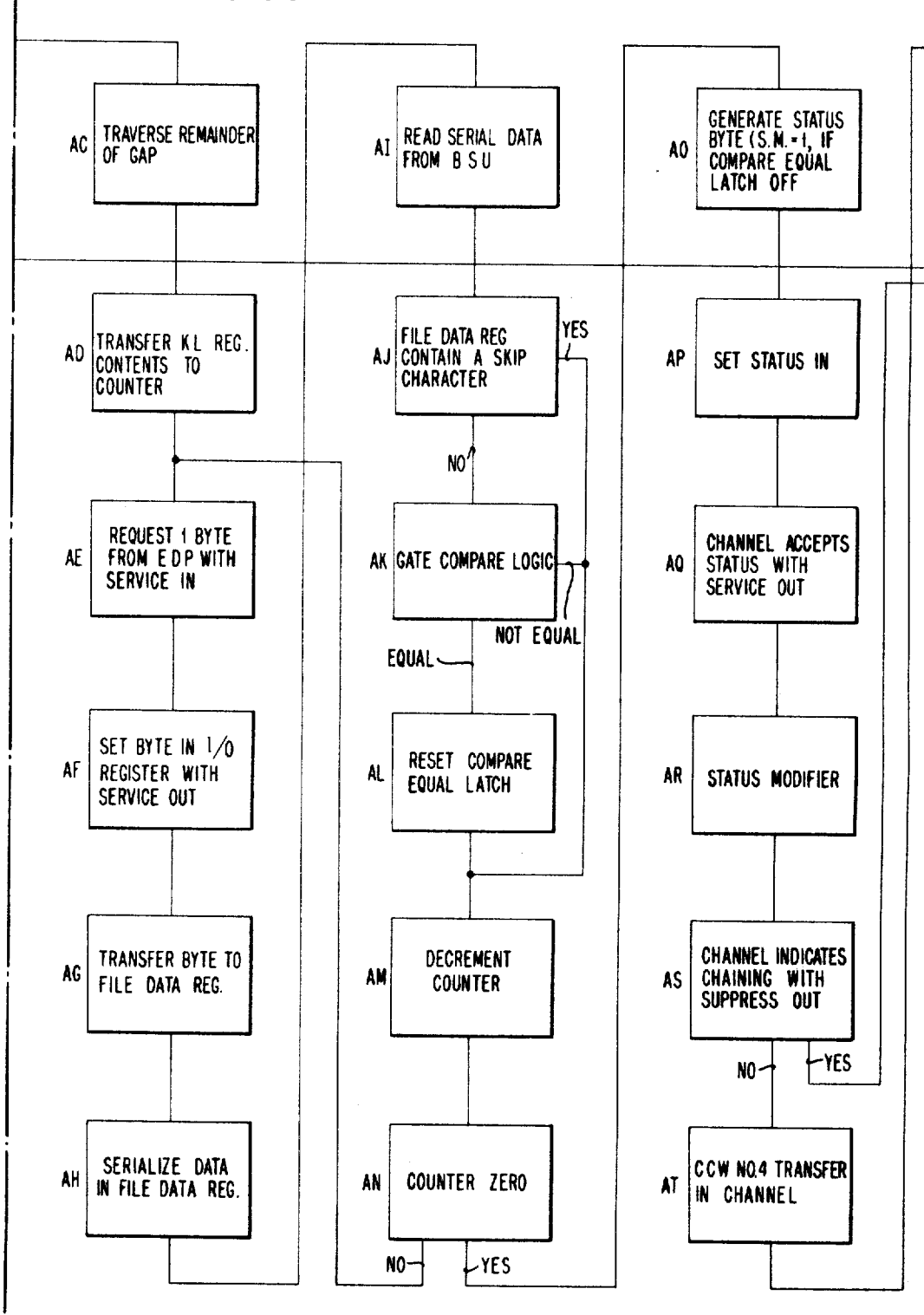
Figure 5D:
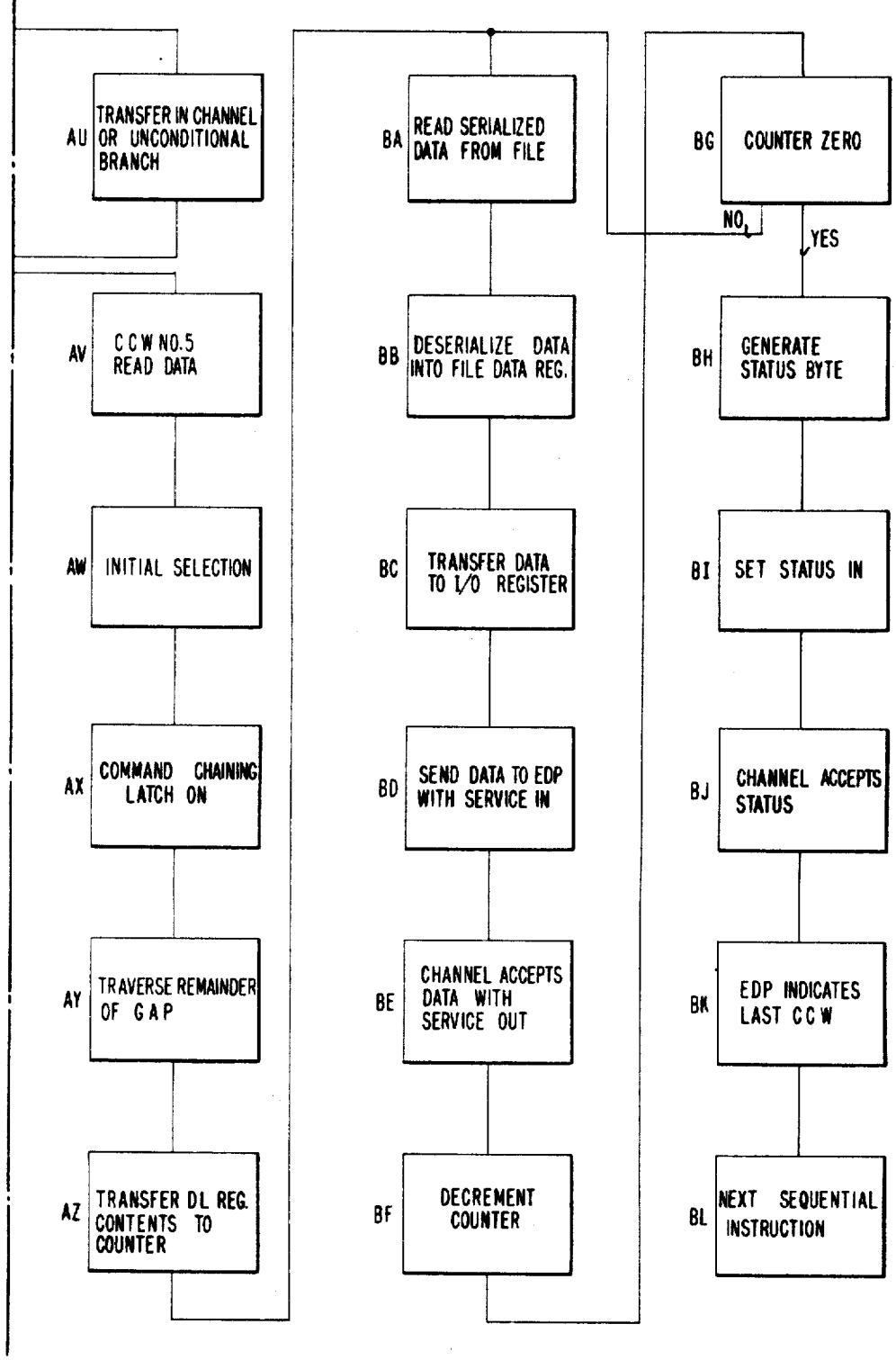

FIGS. 4a and 4b combined are a more detailed block diagram of the instant invention;

FIG. 5 shows the arrangement of FIGS. 5a through 5b;

FIGS. 5a through 5d show a generalized program giving the separate steps required to perform a key search operation;

FIG. 6a is a schematic view of a portion of a stored program initiating an input output operation;

FIG. 6b is a schematic view of a channel control word designating which input-output operation is to be performed.

Figure 1:
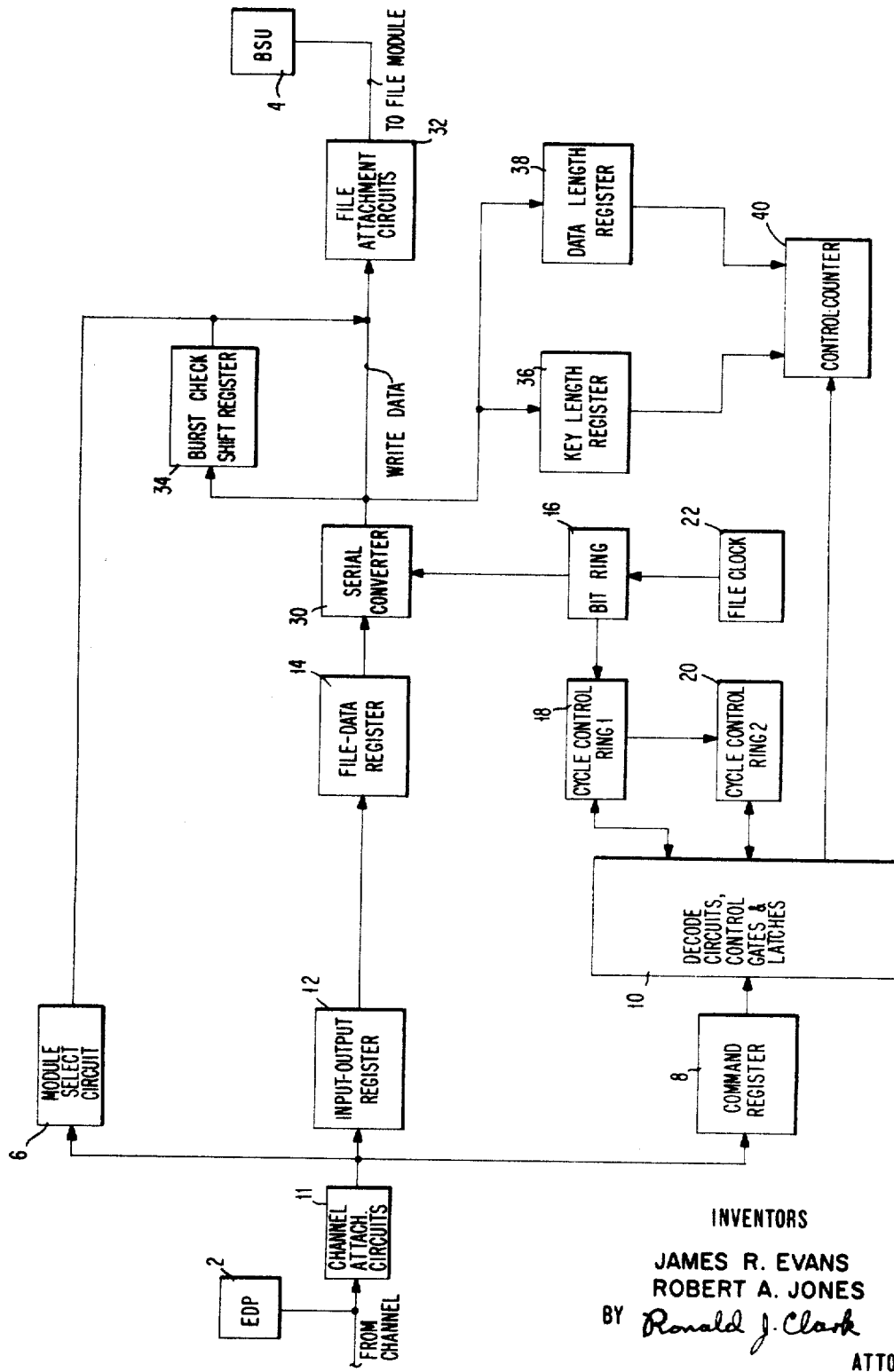
Figure 8A:
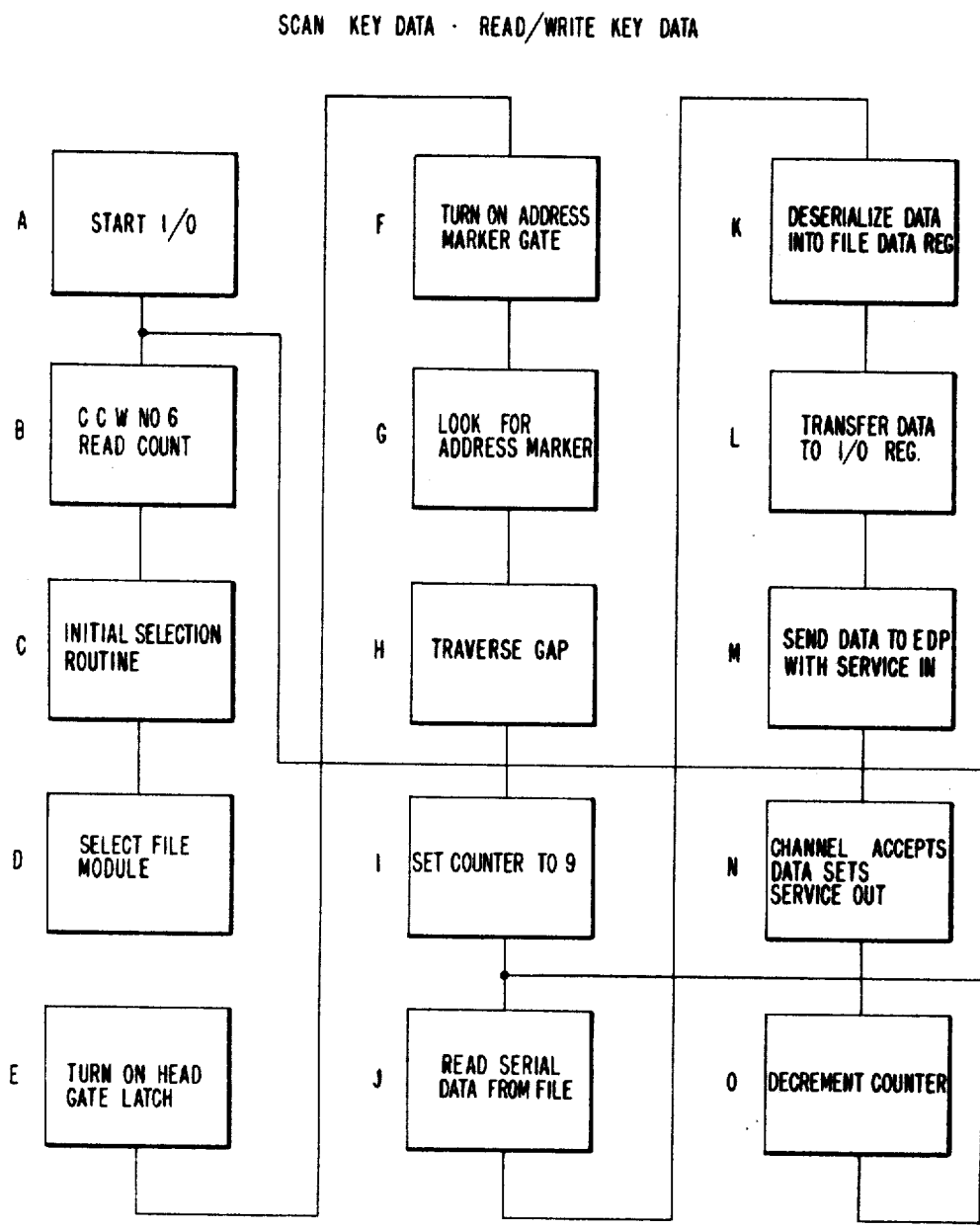
Figure 8B:
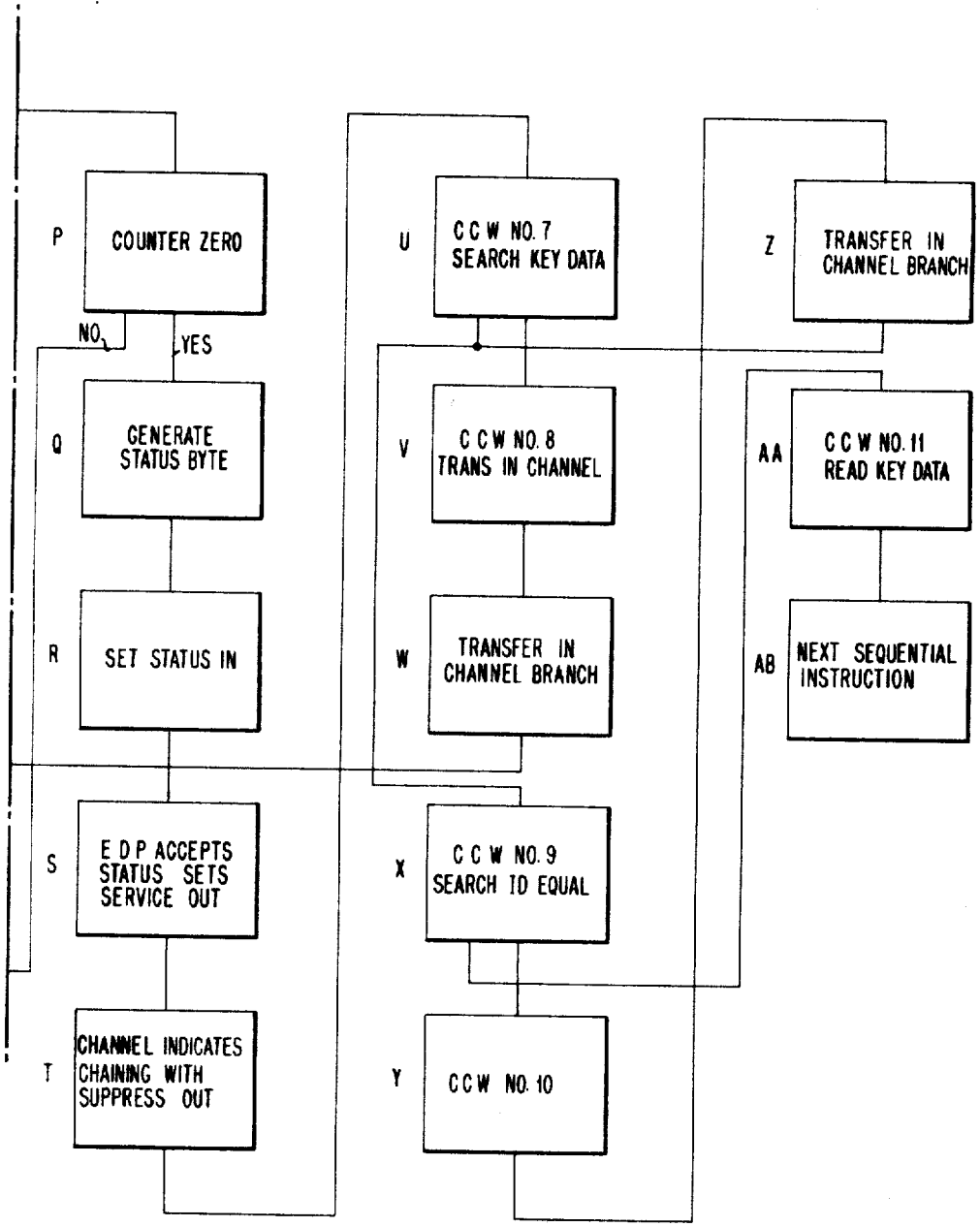

FIG. 7 shows the steps performed in completing the initial selection routine used in the program given in FIGS. 5a through 5d; and FIGS. 8a and 8b show the steps required to perform additional search operations;

FIG. 1 shows a simplified block diagram of the present invention as it controls the data flow between an EDP 2 and a BSU 4. During initial selection, as completely described in U.S. patent application, S.N. 357,361 to A. A. Magdall et al., and assigned to the assignee to the present application, the address of the selected file module is placed in a module select circuit 6 and a command is issued by the EDP 2 for storage in a command register 8. The command is decoded by a decode circuit 10 for generating a plurality of control signals which are used as gating and timing signals throughout the remaining circuitry. All the signals applied to the record search system pass through a channel attachment circuit 11. A complete description of a suitable channel attachment circuit is found in U.S. patent application, S.N. 357,372 and assigned to the assignee of the present application.

Information signals are applied to an input-output (I/O) register 12, one byte at a time. One information byte comprises eight bits of data plus a parity bit for checking purposes. The I/O register 12 acts as an intermediate storage device for data. Each data byte is transformed from the I/O register into a file data register 14 under control of a bit ring 16 and a pair of cycle control rings (CCR) 18 and 20 respectively.

Figure 2A:
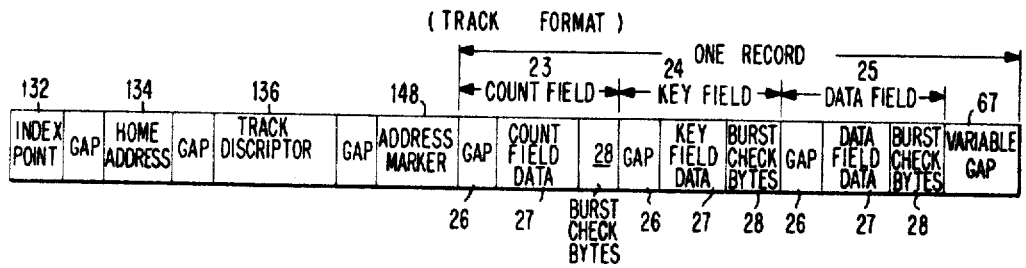
FIG. 2a is a schematic diagram of the first record on a track in the bulk storage unit.

A clock circuit 22 provides the basic timing pulses used throughout the remaining circuits. The bit ring 16 is driven by the clock 22 and is employed to generate a repetitive pattern of eight bit signals, one each for each bit in a data byte. The cycle control rings 18 and 20 are completely described in a U.S. patent application entitled "Record Format Control Circuit," filed March 25, 1964, S.N. 354,563 to A. J. Capozzi, and assigned to the assignee of the present application. In general, CCR 20 defines the areas of a record as a count field 23, a key field 24 and a data field 25 as shown in FIG. 2a. CCR 18 subdivides each of data portion 27 and a burst check portion 28.

From the output of the file-data register 14, the data byte is serialized in a parallel to serial converter 30 using the bit ring timing signals. The serialized bit signals are passed to the addressed BSU 4 by a file attachment circuit 32 which forms no part of the present invention. Simultaneously, the serialized data bits are read into and accumulated by a burst-check register 34. Immediately after the last data byte is written into the BSU 4, the two accumulated burst-check bytes are read from the register 34 into the BSU 4 for checking purposes.

Figure 2B:
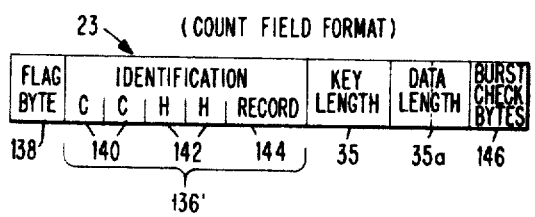

The key length and data length information 35 and 35a, shown in FIG. 2b, in a record are transferred to a key length (KL) register 36 and a data length (DL) register 38, respectively, as the count field 23 of the record is being written. The key-length register 36 is set to the byte count of the key field and the data-length register 38 is set to the byte count of the data field. In turn, these two registers are read into a control counter 40 at the appropriate time. The control counter 40 is decremented by one as each byte is written on the BSU 4. When the control counter reaches zero, the end-of-data time is indicated for its associated field, either key or data. Normally, the incoming data and the count in the control counter 40 end at the same time or an error condition signal is sent to the EDP 2.

Referring to FIG. 3, a simplified block diagram is shown of the data flow between the BSU 4 and the EDP 2. During initial selection, the address of the selected file module is set into the module select circuit 6 and the EDP command is transferred to the command register 8 in the same manner as previously described. The decoded command is again used to condition circuits necessary to execute the desired operation.

Data is received from the BSU 4 through the file attachment circuits 32 in serial form under control of the cycle control rings 18 and 20 and the bit ring 16. During a reading operation, the KL register 36 and the DL register 38 are set from the count field of the record as it is read. The control counter 40 is used to check the byte count of the incoming record against the count specified by the length registers 36 and 38 respectively. All of the data read from the BSU 4 is read into and accumulated by the burst check register 34. The last two bytes of the record are check bytes and are read into the register 34 after the data. The check bytes result in a zero balance in the register 34 as checked by a zero test circuit 42. A non-zero balance indicates an error condition wherein there are extra bits or necessary bits are missing.

The bit ring timing signals control the data flow to the file data register 14. The serial by bit data from the circuit 32 is changed to parallel by bit, serial by byte in a serial to parallel converter 44. From the register 14, the serial bytes of data are transferred to the EDP 2 through the I/O register 12.

FIG. 4a shows that during a write or control operation, the register 12 receives data from bus-out lines 1601–1609. During a read operation, data bytes are placed on bus-in lines 1611–1619 by the I/O register 12. The file data register 14 comprises eight latches, one for each bit in a data byte. These latches are turned on by data from the I/O register 12 during write operations and by data from the BSU 4 during read operations. During write operations, the entire register is set at one time by an input mix circuit 58. During read operations the latches are set one at a time under control of the bit ring on lines 50–57 and the parallel converter 44. The mix circuit 58 comprises a plurality of AND gates responsive to the output of each bit position in the I/O register, and connected to the input of its associated circuits by an equal plurality of wires. The circuit 58 is one means for distributing the output of the register 12 to the plurality of circuits responsive thereto.

The contents of the registers 36 and 38 define the initial value to which the control counter 40 is set before reading the key and data fields. These registers are set from the contents of an operation code transferred from the EDP 2 to the BSU 2 via the serial converter 30 for a read operation and from the data on the addressed track in the BSU 4 for a write operation. The register 36 comprises eight latches having a capacity of a binary 256, while the register 38 comprises twelve latches having a capacity of a binary 8192.

The control counter 40 is loaded from the registers 36 and 38 by an AND circuit 60. The counter 40 controls the advance of the cycle control rings 18 and 20, thereby determining the length of each area of a track. The counter 40 comprises thirteen trigger circuits having a total binary value of 8191. It is set to a particular value for each area of a track and decrements by one each byte time. This reduction in the total count is accomplished by setting or resetting the stage one of the counter by the zero bit output signal of the bit ring 16 on a line 62. Stage one sets when it receives a decrement pulse and is in a reset state. As stage one sets, its output either sets or resets stage two depending on whether stage two is in a set or reset state. The remaining stages operate in the same manner.

The bit ring 16 is an eight position ring producing eight bit time signals, zero through seven. The ring 16 is employed to clock the movement of data to and from the system, the I/O register 12 and the file data register 14.

Additionally, the bit time signals provide gating pulses to load the KL register 36 and the DL register 38 from the serial converter 30 through the AND circuits 63 and 64 respectively and, from the parallel converter 44 through the AND circuits 65 and 66 respectively. The zero bit time signal is also used to advance the cycle control ring 18 and to decrement the control counter 40. The command register 8 is an eight position register employed to store a command byte. The command decode circuit 10 decodes the command signal thereby generating enabling signals for use throughout the remaining circuitry. These enabling signals are not shown in detail since their use is well known to persons skilled in the art and their detailed description would confuse the inventive features of the instant invention.

The cycle control rings 18 and 20 are completely described in the aforementioned patent application S.N. 354,563. However, a brief description is given here to facilitate the understanding of the interoperation of the control rings 18 and 20 with the remaining portion of the instant invention. The pair of cycle control rings identify the different areas of a record and the difference portion of each area. CCR 20 identifies the three fields of each record, 23, 24 and 25 and the variable gap 67, shown in FIG. 2a, following the data field 25. CCR 18 identifies the three portions 26, 27 and 28 within each field and determines the value to which the control counter sets for a particular area of a record. CCR 18 is a four position ring and CCR 20 is a seven position ring. CCR 20 advances one position whenever CCR 18 completes a cycle, except at index time. CCR 18 advances at bit time zero and phase A of the file clocking circuit 22, at index time and at record start time. Each of the positions in both rings are triggers. The triggers are either turned "on" or are "reset" by the phase A pulse. In order to "set" or "reset," a trigger must first be gated to "set" or "reset." When one of the triggers in the rings 18 and 20 is "on," it supplies its own reset gate and the set gate of the next higher position. The trigger in the highest position of each ring gates the lowest position trigger "on." On all operations except SEEK and SENSE operations, the highest position trigger of CCR 18 (CCR 18–3) gates the second lowest position of CCR 18 (CCR 18–1) "on" instead of the lowest position trigger (CCR 18–0). The file clocking circuit 22 comprises a write clocking circuit and a read clocking circuit, both of which are not shown in detail. A more general description should be sufficient. The write clocking circuit performs two basic functions; one of which is to initiate clock cycles, the other of which is to generate file write pulses. The write clocking circuit initiates clock cyles by generating a phase A pulse every eight hundred nanoseconds on an output line 70. The phase A pulse drives the bit ring 16 through each bit ring position. The duration of each bit ring position is the basic time period of one bit. The write clocking circuit generates a file-write pulse every four hundred nanoseconds to represent no data. However, only file-write pulses occurring at phase A time, every eight hundred nanoseconds actually write on the file when a data bit is written. When no data bit is written, both write pulses write on the file. This method of data recording is known as dual frequency recording.

The read-clocking circuit receives amplified file-read data from a selected file. The read clocking circuit detects missing clock pulses, data, and phase A pulses and has a separate output for each. Data is represented by the absence of a clock pulse three hundred to four hundred nanoseconds after phase A time. Phase A pulses initiate clock cycles and they are six hundred to eight hundred nanoseconds apart. The time between phase A is one bit time. Phase A pulses again drive the bit ring in the receive mode to generate the bit time periods.

The burst check register 34 checks all information read from a file unit for extra or missing bits in any combination. The register 34 comprises a sixteen position shift register and accumulates data arithmetically and provides a remainder. The remainder is then written on the file as the two burst check bytes. As data is read from the file unit, it is again accumulated by the shift register. The two check bytes written at the end are added to the register contents and a zero balance is sensed by a zero test circuit 42 if there are no errors.

A status register 72 applies its output byte to an output mix circuit 74. The mix 74 comprises a plurality of AND gates and an OR gate for each bit position of a data byte. Associated AND gates give a plurality of circuits access to the mix 74 by appropriate gating techniques. The status register comprises eight output latches. The function as a temporary storage circuit in preserving various operating conditions of the file control unit as applied by a plurality of lines 75. Upon command from the EDP 2, the content of the register 72 is transferred to the EDP 2 wherein it is examined and thereafter employed to send a new command to the initiating file control unit.

The status register 72 contains eight positions, each indicating a different machine condition. For example, these conditions include machine busy, end of operation and status condition. The only position having a unique purpose in the search operation is a position 75a. Normally, position 75a is set to its unequal state and is changed to its equal state by a latch 76 when a compare circuit 77 indicates that the data read from the file is equal, high or equal, or low or equal to the search mark held in the EDP 2.

The module select circuit 6 comprises an address register 78 having three latches connected to the lower three lines of the bus-out lines 1601–1609, a valid address latch circuit 80, and a decode circuit 82 responsive to both the register 78 and the latch circuit 80.

Referring to FIGS. 4 and 5, a file search operation performed by the instant invention begins with an initial selection sequence that is fully described in the aforementioned U.S. patent application, S.N. 357,361. However, a brief description is given here to facilitate the understanding of the initial selection sequence with the remaining portion of the instant invention. A search operation begins when the EDP 2 reaches an Input-Output (I/O) instruction 84 in its stored program known as a Start (I/O) instruction, block A of FIG. 5a. The format of a Start (I/O) instruction is shown in FIG. 6a. A first portion 90 contains indicia identifying that it is a Start I/O instruction. A second portion 92 specified by address indicia the I/O module and one particular access mechanism in the module to which the instruction applies. A third portion 94 specifies the starting address in the processor's main memory where a series of channel command words (CCW) are stored. The CCW, block B, is shown in FIG. 6b and is shown to include a first area 96 which specifies a single command, such as read, write or search. A second area 98 specifies the address in main memory which stores the first character of the search mask. A third area 100 specifies the number of bytes in the operation. The area 100 in the CCW No. 1 specifies the length of the identification field 23 shown in FIG. 2b. Normally, the length of the field 23 is a fixed length of six bytes.

The OP portion 96 of the CCW No. 1 begins the record search operation by an initial selection routine, block C, which is completely described with reference to FIG. 7. In this routine, the channel portion of the processor 2 first places the address indicia from the Start I/O OP on the bus-out lines 1601–1609, raises the ADDRESS-OUT control line 1621, and raises the SELECT-OUT control line, blocks C1, C2, and C3. The ADDRESS-OUT control line 1621 gates the address from the mix circuit 58 to the module address register 78 by an AND circuit 102, and transfers the contents of the register 78 and the latch circuit 80 to the decode circuit 82. The decode circuit acknowledges its own address by turning on a request latch 104, blocks C4 and C5. If the address stored in the latch circuit 80 does not match with the address placed on the bus-out lines 1601–1609, the file control unit drops out and so notifies the CPU, block C6.

The SELECT OUT signal is applied as the second enabling signal to the AND gate 108 for causing an operational latch 110 to switch to its first stable state wherein it generates an enabling signal called OPERATIONAL IN on a line 1629, block C7. The output of the latch 104 is applied to a pair of AND gates 106 and 108. The AND gate 106 has a second enabling input signal comprising the ADDRESS OUT signal on the line 1621. The output of the AND gate 106 is applied to the latch 80 and reads out the address permanently stored therein to the I/O register 12 for transmission to the bus-in lines 1611–1619, block C8. The EDP drops the ADDRESS-OUT signal on the line 1621 a reasonable time after it was raised before which the address compare operation was completed and the contents of the latch 80 were applied to the register 12, block C9. The EDP 2 now places the command signal 96 on the bus-out lines 1601–1609, block C10. The OPERATIONAL IN signal turns on a trigger 112 for generating an ADDRESS IN signal on a line 1624, block C11. The ADDRESS IN signal gates the address in the I/O register 12 to the EDP 2 by the bus-in lines 1611–1619. The EDP 2 compares this address with the address 92 from the Start I/O OP, FIG. 6a, and raises the COMMAND OUT signal on a line 1622 when the addresses compare equal, block C12. The command signal 96 on the mix 58 is gated into the command register 8 by the COMMAND OUT signal, block C13. The address in trigger 112 is reset by the COMMAND OUT signal, block C14, which signal also interrogates the status register 72, and transfers its contents to the I/O register 12, block C15.

The contents of the status register 72 reflect the capability of the BSU 4 to execute the given operation. If the addressed unit is busy or if error condition exists then appropriate bits are set in the status register 72 to indicate these and other malfunctioning conditions by the plurality of lines 75.

When the ADDRESS IN signal, line 1624, is detected by the EDP 2 to be off, then the EDP resets the COMMAND OUT signal, on line 1622, block C16. The turning off of the COMMAND OUT signal turns on a STATUS IN latch 114, block C17 and gates the contents of the status register 72 to the mix circuit 74. The STATUS IN signal, line 1625, alerts the EDP 2 to inspect the status information on lines 1611–1619, block C18. The EDP 2 responds with a SERVICE OUT signal on line 1623 which means proceed with the operation if a zero status was presented, block C19, and the operation specified by the OP code 96 is begun, block C20. The STATUS IN latch 114 is reset by SERVICE OUT signal. If command chaining is to be performed then EDP 2 raises SUPPRESS OUT, line 1630 concurrently with SERVICE OUT. The SUPPRESS OUT and SERVICE OUT signals set command chaining gate latch 116.

The next operation is to activate the desired access mechanism of the selected module, block D. This is accomplished by turning on a head gate latch 118 in response to the COMMAND GATE OFF signal and the SERVICE OUT signal, block E. The latch 118 is normally set when the command register 8 contains a READ, WRITE or SEARCH command. The latch 118 provides the selection enabling signal for activating the head identified by the module address register 78. The activation of the latch 118 turns on a search address marker gate 120, block F, which generates an enabling signal on a line 122 for activating an address marker recognition circuit 124. The command decode circuit 10 determines whether the SEARCH output line 126, the READ output line 128, or the WRITE output line 130 is up.

The storage tracks in the BSU 4 carry information in the format shown in FIG. 2a. The access mechanism included in the file attachment circuit 32 shown in FIGS. 1 and 3, positions the desired access arm to the correct track of the disk. An index point position 132 indicates a physical location on the disk surface and is usually identified by a notch. A home address position 134 identifies the disk surface, the track number and access mechanism needed to read the record. A track description portion 136 is identified to the identification portion 136' of the count field shown in greater detail in FIG. 2b and includes a flag byte 138, which byte is not pertinent to the present description. The portion 136 and the count field data portion 27 of the count field 23 gives the disk surface and track number identification indicia as a pair of bytes 140, and the access mechanism identification indicia as a pair of bytes 142. The record address is given by a single byte 144. The remaining part of the count field 23 comprises one byte 35 giving the key length, two bytes 35a giving the data length and the aforementioned burst check bytes comprise a pair of bytes 146. The associated gap 28 is not shown.

An address marker portion 148 in the track format precedes each record. The address marker comprises any unique combination of clock and data pulses. Regardless of the form employed, the function of the address marker 148 is to announce the coming of a record area of the track, block G. After the recognition of an address marker 148 the gap 26 of the count field 23 is traversed under the control of the CCR 18 and 20, block H.

The address marker recognition circuit 124 responds to the address marker 148 and generates an enabling output signal on a line 150, which enabling signal is applied to the CCR 18 and CCR 20. The CCR 18 is set to its second (CCR 18–1) position, and the CCR 20 is set to its second (CCR 20–1) position. The combination of these output signals injects a numeral into the control counter 40 from a numeral inject circuit 152 which defines the length of a gap portion 26 of the count field 23 in the record. For the purpose of this description, the gap 26 of the count field 23 is one byte in length. When the control counter 40 is decremented to the zero condition by the receive phase A signal generated by the file clocking circuit 22 and the bit ring 16, a zero count recognition circuit 152a samples the content of the counter 40. In response to a zero count, the circuit 152a generates an enabling signal on a line 153 which advances CCR 18 to its third position (CCR 18–2) and sets a service in latch 154 to its first stable condition wherein the latch 154 generates a SERVICE IN signal on a line 1626 and requests a byte from the EDP 2. The advance of the CCR 18 also injects a new numeral into the control counter 40 which defines the length of the count portion 27 of the count field 23. For the purpose of this description, the count field is nine bytes in length, blocks J and I respectively. The EDP 2 responds to the SERVICE IN signal with a SERVICE OUT signal on the line 1623 and with the first of the identification bytes 140, shown in FIG. 2b, from the count field mask held in main memory on the BUS OUT lines 1601–1609. The flag byte 138 is being ignored during the functional description since the purpose of the flag byte 138 is to provide a time delay during which the EDP retrieves the corresponding byte of the ID field 136'. The data byte is gated into the I/O register 12, block K. The SERVICE OUT signal on the line 1623 resets the service in latch 154. The zero time signal on the line 50 of the next bit ring sequence gates the contents of the I/O register 12 to the file data register 14, block L, and gates the first bit of the byte in the register 14 to the compare circuit 77 by the serial converter 30, block M, concurrent with the reading of the corresponding bit from the BSU 4, block N. The results of the compare operation are gated to the status register 72, block O. An unequal compare signal does not change the contents of the status register if the command calls for the unequal condition. Generally, the status bit 75a is set to represent the condition opposite the desired condition. More specifically, when searching to an equal condition the status bit 75a is set to represent the unequal condition. Subsequent and successive equal compare operations reverse the latch to represent the equal compare condition, block P. However, if after one equal compare operation an unequal condition is sensed and then later an equal condition is sensed the status bit 75a remains in the unequal condition.

The zero time signal on the line 50 of the current bit ring sequence decrements the counter 40, block Q. The zero count recognition circuit 152a is operative to determine if the circuit 152a is in the zero state, block R. The remaining bytes in the identification portion 136' of the count field are compared in the identical manner. That is, operation of the system returns to block J when the count is not zero and an additional byte is requested from the processor and provided temporary storage in the register 14 as described hereinbefore. Immediately thereafter, this byte is compared bit by bit with a corresponding byte from the BSU 4 also in the manner previously described in blocks M through R. However, during the reading of the KL area 35 and the DL area 35a, no corresponding bytes are received from the EDP 2 and consequently the compare operation is restricted to the ID area 136'. Additionally, the KL and DL indicia are loaded during their respective reading periods into the KL and DL registers 36 and 38 under control of the CCR 18 and 20, and the control counter 40.

The count field compare operation is terminated by the zero recognition circuit 152a which generates an enabling signal for advancing the CCR 18 to its fourth position (CCR 18–3), which position corresponds to the burst check portion 28 of the count field 23 in the record format. A corresponding numeral is injected into the command register defining the length of the burst check area 28. When the zero recognition circuit again reaches the zero condition the enabling signal generated thereby advances the CCR 18 to its second position (CCR 18–1) and the CCR 20 to its fifth position (CCR 20–4). Additionally, the enabling signal from the circuit 152a gates the output of the condition latch 76 to the status register 72, sets the status in latch 114 and gates the contents of the register 72 to the I/O register 12. The STATUS IN signal gates the status byte to the processor for inspection of the status modifier portion 75a to determine the completion of the given command, blocks S, T and U. When the inspection of the status modifier, block V, indicates a high or equal compare result, the processor responds by generating the SERVICE OUT signals and a SUPPRESS OUT signal on the line 1623 and a line 1630 respectively, which signals are applied to the chaining latch 116, setting it to its first stable state wherein it generates an enabling signal on a line 156, block W. When the information in the count field does not satisfy the record description requirement from the EDP 2, that record is normally skipped and the count field of the next record is examined. This repeat operation is achieved by accessing CCW No. 2, block X, which is a transfer in channel (TIC) command described in greater detail in the previously identified patent application, S.N. 357,361, block Y. The signal on the line 156 is applied to the I/O register 12 and the command register 8 to gate a new command signal into the command register 8 without delay. The next command is to search for a key signal located in the data portion 27 of the key field 24. This search operation is the result of the OP code 96 in CCW No. 3, block Z. The initial selection routine, block AA, is repeated as described with reference to block C and FIG. 7. The command chaining latch is still on, block AB.

A gap portion 26 of the key field 24 is traversed in the same manner as previously described, block AC, and the data portion 27 of the key field 24 is identified with the CCR 18 advancing to its third position (CCR 18–2). The length of the key field data portion 27 of the key field 24 is specified by the contents of the KL register 36. The length indicia from the KL register 36 is loaded into the control counter 40 to specify the length of the key field, block AD. A key byte is requested from the EDP 2 by raising the service in latch 154, block AE. Each byte sent in response to a SERVICE IN signal is gated through the I/O register 12 by the SERVICE OUT signal, block AF. The byte in the I/O register 12 is transferred to the file data register 14, block AG, serialized in the converter 30, block AH, in unison with the reading of the corresponding byte from the BSU 4, block AI.

Each byte position of the key field need not form an active part of the search mask. More specifically, byte positions of the key field portion 27 of the key field 24 are skipped over by a unique byte combination of bit signals. The presence of a skip character is determined by a skip character recognition circuit 158 which generates a disabling output signal for each skip character recognized. This disabling signal is applied to the compare circuit 77 by a line 160, whereby the compare operation between the skip character and its corresponding byte from the BSU is not performed. More specifically, the disabling signal on the line 160 prevents the latch 76 from being set, block AJ.

Each byte so requested is compared against a corresponding byte read from the file, and the compare latch is set accordingly in the absence of a skip character, block AK. An equal signal sets the status latch 76, block AL. The counter 40 is decremented by the zero time signal of the bit ring or by a skip character signal on a line 160, block AM.

The completion of the search of the key field is again identified by the decrementing of the control counter 40 to zero, block AN. If the control counter 40 is not decremented to its zero condition, additional bytes are retrieved until all KL bytes are retrieved and the counter is in its zero condition. Therefore, blocks AE through AN are repeated until the zero condition is sensed. The enabling signal from the zero count circuit 152a advances CCR 18 to its fourth position (CCR18–3) whereby it generates an enabling signal for gating the contents of the burst check portion 28 of the key field 24 into the register 34. Additionally, the condition latch 76 is checked for a change and in the event of a change, the modifier position of the status register is also changed to reflect that the compare operation was equal, block AO.

Assuming that the status of the latch 76 remained the same, thereby indicating there had been no successful compare equal operation, the CCR 18 and 20 would set the STATUS IN latch 154, generating a STATUS IN signal, and gate the status byte to the processor, block AP. In response to the SERVICE IN signal, the processor accepts the status byte, block AQ. The status byte is examined for the changed modifier position, block AR, and indicates chaining by generating the SUPPRESS OUT signal, block AS. In this instance there is no changed modifier bit, therefore CCW No. 4 is accessed, block AT, and the processor 2 executes a transfer in channel (TIC) operation, block AU, and waits to start a search key equal operation with mask on the next succeeding record in the same manner as just described, block Z.

However, if the status modifier bit reflects a change, the key search operation is completed successfully and the EDP 2 accesses CCW No. 5 calling for a read data OP, block AV. Again the initial selection routine is performed, block AW, prior to reaching the next immediate data area 27 of the data field 25. The command chaining latch 116 is turned on by the presence of the SERVICE OUT and the SUPPRESS OUT signals on the lines 1623 and 1630 respectively, block AX. The output of the chaining latch 116 gates the READ DATA command signal into the command register 8 before the reading head traverses the gap 26 of the data field 25, block AY. The CCR 18–2 indicates the beginning of the data field 27 of the data field 25 by gating the contents of the DL register 38 into the counter 40, block AZ. Additionally, CCR 18–2 gates the serial data bits read from the file into the register 14 by the parallel converter 44, blocks BA, BB, and BC. The next subsequent zero position of the bit ring 16 gates the assembled byte from the register 14 to the I/O register 12 and sets the SERVICE IN latch 154, block BD. The EDP 2 responds to a SERVICE IN signal by a SERVICE OUT signal which gates the byte from the I/O register 12 to the processor where it is stored in main memory, block BE. The counter 40 is decremented for each character so transferred to the EDP 2 and the recognition circuit 152a constantly monitors the counter 40 for a zero condition, blocks BF and BG. This character transfer operation is repeated using blocks BA through BG until the advance of CCR 18 signals the entry into the burst check area 28 of the data field 25. CCR 18 is advanced when the counter 40 contains a zero. At the completion of the normal burst check operation, the status byte from the register 72 is sent to the processor, along with the SERVICE IN signal, blocks BH and BI. The processor inspects the status byte for error conditions and inspects its own internal program for additional chaining control signals, block BJ. The successful retrieval of the data portion 27 of the data field 25, ends the key search operation unless additional CCW's are chained, blocks BK and BL.

A record search sequence for a key signal in the key and data fields, 24 and 25 respectively, combined or only in the data field 25 alone is now described with reference to the preceding key search operation to supply the required details. Referring to FIG. 8, the present operation includes the same blocks A through I previously described with reference to FIG. 7. A divergence of operation begins with block J in response to CCW No. 6 accessed in block B. CCW No. 6 calls for a reading of the count field data portion 27 of the count field 23 into the EDP 2 rather than a searching of the identification portion 136' of the count field 23. Each byte in the count field 23 is read off the file in serial form, block J, deserialized in the converter 44, block K, and transferred to the I/O register 12 by the file data register 14, block L. The zero bit time signal from the bit ring 16 notifies the EDP 2 of the available byte in the register 12 by generating a SERVICE IN signal, block M. The EDP 2 responds with a SERVICE OUT signal, block N, thereby accepting the byte for storage within the EDP's storage area. The counter 40 is decremented and the zero count recognition circuit 152a looks for a zero state in the counter 40, blocks O and P. If the counter 40 is not zero blocks J through P in FIG. 8 are repeated to transfer the count field to the EDP 2. When the counter is zero, the contents of the register 72 is transferred to the I/O register 12, block Q. A STATUS IN signal alerts the EDP of the presence of the status byte in the I/O register 12, block R. The EDP 2 responds to the STATUS IN signal with a SERVICE OUT signal when it is free to accept the STATUS IN signal, block S. The EDP 2 indicates the chaining of CCW's by sending a SUPPRESS OUT signal to the latch 116, block T.

Once the count field is held in the EDP 2 storage area, the next CCW No. 7, block U, specifies a search with a mask held in EDP storage for a key signal located in the combined key and data fields or the data field alone. This CCW No. 7 causes the same sequence of operations as previously described with reference to CCW No. 3 shown in FIG. 5b. However, with reference to CCW No. 7, the search continues for the data area 27 in both the key field 24 and the data field 25. If the results of the search are unfavorable as indicated by the status byte, CCW No. 8 is accessed, block V, causing a transfer in channel, block W, back to CCW No. 6 which will control the reading of the count field of the next successive record. The count field previously read into the EDP 2 will be destroyed.

However, if the search operation is successful as indicated by the status byte, CCW No. 9 is accessed, calling for a search identification equal operation, block X. CCW No. 9 is the same as CCW No. 1 described with reference to FIG. 5a. Blocks Y and Z in FIG. 8 control the repetitive search for the identification portion 136' of the count field 23 read into the storage area of the EDP 2 by CCW No. 6.

After an identification portion 136' of a count field is located which is the same as that held in the EDP 2, CCW 11, block AA directs the reading of the data portion 27 of the key and data fields 24 and 25 respectively. After the reading operation is completed the EDP 2 moves to its next sequential instruction, block AB.

While the invention has been particularly shown and described with reference to a preferred embodiment thereof, it will be understood by those skilled in the art that various changes in form and details may be made therein without departing from the spirit and scope of the invention.

What is claimed is:

1. In combination, a record search system comprising,
   a data processor operating in response to a stored program and said program includes a plurality of first characters arranged in a search mask,
   a bulk storage unit for storing a plurality of successively positioned records and each record having at least an address marker field and a count field and a key field and a data field,
   a plurality of gap areas and one of said gaps being positioned intermediate successive pairs of said fields,
   decode means responsive to said stored program for designating the type of operation to be performed and for generating a plurality of signals to control the performance of the operation selected,
   first means responsive to said decode means for reading and for writing second character indicia in each of said fields,
   second means responsive to said data processor and said decode means for locating said address marker,
   third means responsive to said second means and including a bit position counter for identifying the reading and writing of said respective fields by said first means,
   a first latch means responsive to said third means and said processor for controlling the fetching of one of said first characters from said processor,
   intermediate storage means responsive to said processor for storing one of said first characters,
   a compare means having a first input channel responsive to said first means and a second input channel responsive to said intermediate storage means,
   fourth means for indicating the result of said compare operation, and
   said first latch being responsive to said counter for fetching successive ones of said first character in synchronism with the reading of said second character by said first means.

2. A record search system as recited in claim 1 wherein the fetching of a first character is in advance of the reading of a corresponding second character by the storage capacity of said intermediate storage means.

3. The record search system as recited in claim 1 wherein said fourth means comprises,
   a register having a plurality of storage positions,
   a second latch responsive to said compare means and connected to one of said storage positions, and
   signal means originating in said processor for transferring the contents of said register to said processor.

4. A record search system as recited in claim 1, wherein said stored program includes a plurality of operation codes, and further including,
   fifth means responsive to said processor for indicating a successful compare operation, and
   sixth means responsive to said fifth means for immediately gating the next operation code from said program into said decode means while said gap intermediate said count field and said key field is being traversed.

5. In combination, a record search system comprising,
a data processor operating in response to a stored program and said program including a plurality of first characters grouped together as a search mask,
a bulk storage unit having a recording surface upon which a plurality of continuous storage tracks are placed and each track contains at least one record comprising at least a key field and a data field,
said search mask is of indefinite length and includes a plurality of characters corresponding to portions of said key field and said data field, each of said records further including address indicia for identifying the track location of said record in said bulk storage unit,
first means for reading each of said records,
means for rotating said surface and said tracks being continuously revolved past said reading means,
second means for comparing said key field to said search mask included in said stored program and for generating a signal indicating the location of the desired key field during a corresponding portion of one revolution, said processor temporarily storing said address indicia during said compare operation,
third means responsive to said signal and including said first means for reading said data field during a corresponding portion of same revolution, and
fourth means employing said stored address indicia and including said second means for locating said identified record location whereby, said reading means transfers both said key field and said data field to said processor.

6. A record search system as recited in claim 5, wherein said search mask is of indefinite length,
said compare operation proceeds in serial order, and
a one character buffer register temporarily stores each character in said mask just prior to comparison to a corresponding character read from a corresponding field.

7. A record search system as recited in claim 7, wherein said search mask includes special skip characters, and
means connected to said compare means for detecting said skip characters whereby, the compare operation is suspended upon the detection of said skip character.

References Cited

UNITED STATES PATENTS

| | | | |
|---|---|---|---|
| 3,290,659 | 12/1966 | Fuller et al. | 340—172.5 |
| 3,273,130 | 9/1966 | Baskin et al. | 340—172.5 |
| 3,281,788 | 10/1966 | Herman et al. | 340—152 |
| 3,259,886 | 7/1966 | Singer et al. | 340—172.5 |
| 3,247,365 | 4/1966 | Dell et al. | 235—164 |
| 3,149,309 | 9/1964 | Schmidt | 340—172.5 |
| 2,969,525 | 1/1961 | Hill | 340—174.1 |

PAUL J. HENON, *Primary Examiner.*

GARETH SHAW, *Assistant Examiner.*